(12) United States Patent
Petculescu et al.

(10) Patent No.: US 6,473,750 B1
(45) Date of Patent: Oct. 29, 2002

(54) ADAPTIVE QUERY EXECUTION IN A DISTRIBUTED DATABASE SYSTEM

(75) Inventors: Cristian Petculescu, Redmond; Amir Netz; Mosha Pasumansky, both of Bellevue; Alexander Berger, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/419,452

(22) Filed: Oct. 15, 1999

(51) Int. Cl.[7] .............................................. G06F 17/30
(52) U.S. Cl. ........................................... 707/3; 707/102
(58) Field of Search ................................ 707/3, 102, 1, 707/2, 4, 100, 200

(56) References Cited

U.S. PATENT DOCUMENTS 5,978,796 A * 11/1999 Malloy et al. .................. 707/3
6,122,636 A *  9/2000 Malloy et al. .............. 707/102
6,205,447 B1 *  3/2001 Malloy ........................ 707/102

* cited by examiner

*Primary Examiner*—Diane D. Mizrahi
(74) *Attorney, Agent, or Firm*—Woodcock Washburn LLP

(57) ABSTRACT

Systems, clients, servers, methods, and computer-readable media of varying scope are described in which, a database client applies an adaptive method to dynamically determines whether a particular request should execute on the client-side or the server-side of a client-server database system. In determining where a particular request should be executed, the database client analyzes the size of the data sets involved and the data flow generated by the data sets.

43 Claims, 4 Drawing Sheets

ADAPTIVE QUERY EXECUTION IN A DISTRIBUTED DATABASE SYSTEM

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 1999, Microsoft, Inc.

FIELD

The present invention pertains generally to computer-implemented databases, and more particularly to techniques for adaptively distributing the execution of queries in a database system.

BACKGROUND

Online analytical processing (OLAP) is a key part of most data warehouse and business analysis systems. OLAP services provide for fast analysis of multidimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Furthermore, OLAP services typically provide analytical tools to rank, aggregate, and calculate lead and lag indicators for the data under analysis.

OLAP services are conventionally provided using a client-server model. An OLAP server is a high-capacity, multi-user data manipulation engine specifically designed to support and operate on multi-dimensional data structures. An OLAP client interfaces with the OLAP server, thereby providing OLAP services to external application programs. For example, an OLAP client may provide OLAP services to a variety of external application such as a data mining application, a data warehousing application, a data analysis application, a reporting application etc.

In conventional systems, certain tasks are handled by a database client while others are handled by a database server. An example of a client-side task is the presentation of data to the external application. An example of a server-side task is the data retrieval from data storage. In conventional database systems, the responsibility of executing a particular task is pre-assigned for execution by either the client or the server. Often, the majority of the tasks are assigned to the server such that the client machines are under-utilized. Thus, there is a need in the art for flexible, yet powerful technique for balancing the execution of queries between the database server and the database client. There is a need in the art for a technique that dynamically determines where queries should be executed.

SUMMARY

The above-mentioned shortcomings, disadvantages and problems are addressed by the present invention, which will be understood by reading and studying the following specification. Systems, clients, servers, methods, and computer-readable media of varying scope are described in which, an adaptive method is applied in order to determine whether a particular request should execute on the client-side or the server-side of a client-server database system. In determining where a particular request should be executed, the method analyzes the size of the data sets involved and the data flow generated by the data sets. More specifically, the method first determines whether a particular request is a reasonable candidate for execution on the remote server. In making this decision the method determines whether the request result in large data sets, whether the user explicitly requested that the query be executed on the remote server, and whether the data set already exists on the client. In addition, the method examines the data flow and whether the request reduces the size of the data set. Finally, the method determines whether the particular request is an exception that falls within a class of requests that cannot be executed remotely, such as if the request requires a user-defined function that only exists on the client.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, methods of an exemplary embodiment of the invention are provided. Finally, in the fourth section, a conclusion of the detailed description is provided.

Hardware and Operating Environment

Figure 1:
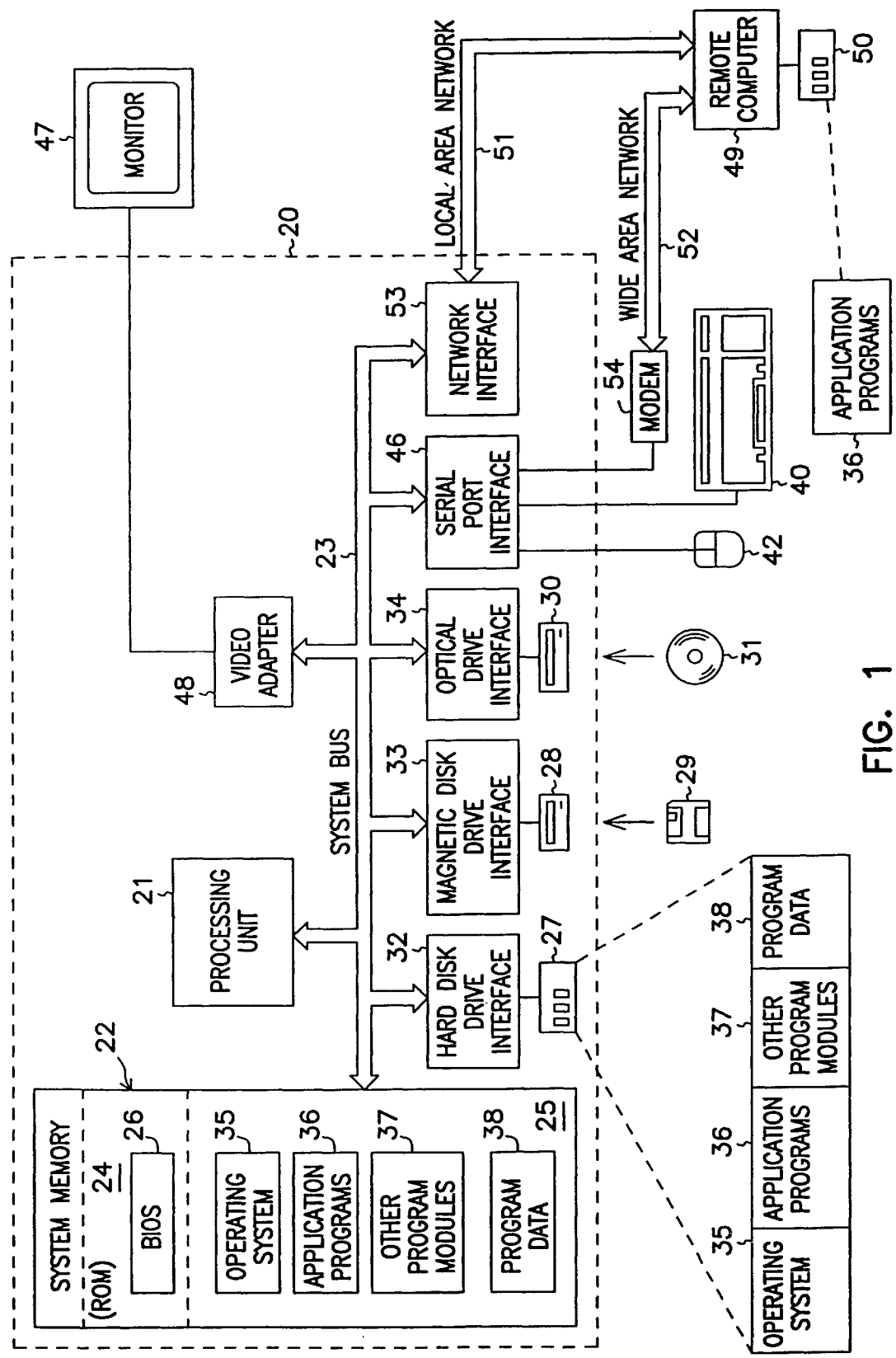
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
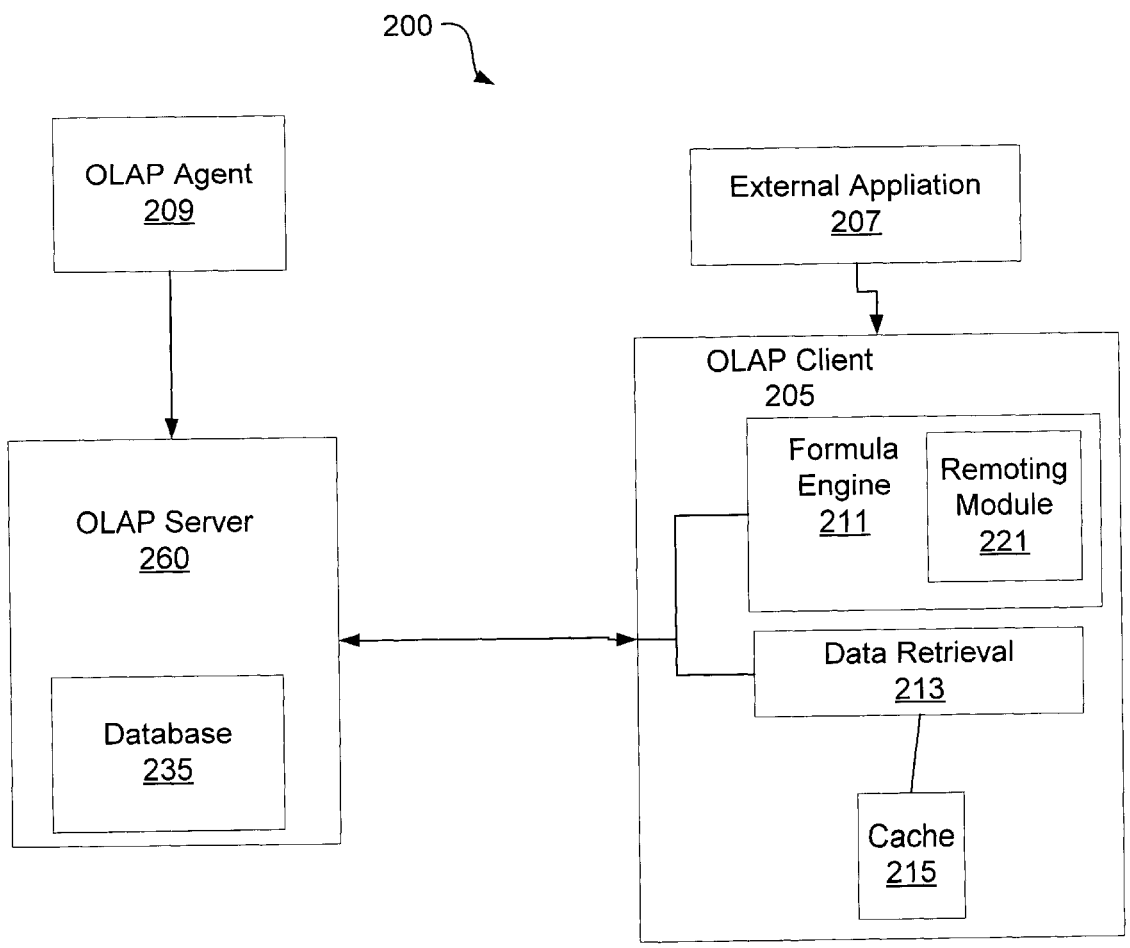
FIG. 2 is a block diagram illustrating a multidimensional database processing systems incorporating the present invention.

FIG. 2 is a block diagram illustrating a multidimensional database processing systems 200 incorporating the present invention. The operating environment includes an OLAP client 205, OLAP server 260, OLAP agent 209 and one or more external software applications 207. The concepts of the invention are described as operating in a distributed, multiprocessing, multithreaded operating environment provided by one or more computers, such as computer 20 in FIG. 1. Furthermore, OLAP client 205, OLAP server 260, OLAP agent 209 and software applications 207 represent software modules that may execute on any combination of such computers. For example, OLAP client 205 and OLAP server 260 may even execute on a single machine while still communicating via client/server techniques.

OLAP Server 260 provides OLAP services to one or more clients, such as OLAP client 205. In one embodiment of the invention, the OLAP server 260 is a version of the SQL Server OLAP Services product from Microsoft Corporation. However, the invention is not limited to any particular OLAP server product, as those of skill in the art will appreciate.

External application 207 represents an application program that requires the services of an OLAP system. Application 207 can be any type of application that interacts with the OLAP system 200, for example, a data mining application, a data warehousing application, a data analysis application, a reporting application, a user interface incorporating a query tool, etc. Application 207 typically interacts with OLAP system 260 by issuing OLAP queries to OLAP client 205. In one embodiment application 207 represents a user interface of OLAP client 205. Formula engine 211 within OLAP client 205 parses, binds and, as described in detail below, either executes the query locally or forwards the query to OLAP server 260 based on a recommendation from remoting module 221.

In one embodiment of the invention, OLAP client 205 includes a local cache 215. In this embodiment data retrieval module 213 determines whether requested data cells have been previously cached in a local cache 215. If so, the cell data is returned to the application 207 from the cache, eliminating the time and resource expense required to obtain the cell data from the OLAP server 260. Upon receipt, OLAP client 205 returns the cell data to the client application 205. Any newly received cell data is cached in local cache 215 for potential later use.

In one embodiment of the invention, OLAP server 260 includes database 235 that represents data stored in a relational format on a persistent storage device such as hard disk drive 27 of FIG. 1. Examples of such databases include, but are not limited to SQL Server, Oracle, Sybase, Informix etc. Other database formats are also readily suitable to the concepts of the invention such as storing the data in a flat file format. In one embodiment, database 235 is a multidimensional database having dimensions and measures as described above.

According to the invention, remoting module 221 dynamically determines whether a query should be executed locally or remotely. Generally speaking, remoting module 221 seeks to balance a tradeoff between an increase in system scalability that is gained by executing queries locally versus any resulting increase in network traffic and memory consumption. Remoting module 221 makes this decision in real-time, on a per query basis, by analyzing the sizes of the data sets involved in the query and the data flow that they generate.

A system level overview has been described in which a multidimensional database processing systems incorporates the present invention. According to the invention, an OLAP client applies an adaptive method to dynamically determine whether a particular request should execute on the client-side or the server-side of a client-server database system. In this manner, remoting module 221 considers the tradeoff between an increase in scalability and an increase in network resources, thereby determining, on a per query basis, whether the query should be executed remotely via OLAP server 260 or executed locally via OLAP client 205. Remoting module 221, therefore strives to load balance between the OLAP client 205 and the OLAP server 260.

METHODS OF AN EXEMPLARY EMBODIMENT OF THE INVENTION

In the previous section, a system level overview of the operation of an exemplary embodiment of the invention was described. In this section, the particular methods of the invention performed by an operating environment executing an exemplary embodiment are described by reference to a series of flowcharts shown in FIGS. 3 and 4. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 3 and 4 are inclusive of the acts required to be taken by an operating environment executing an exemplary embodiment of the invention.

Figure 3:
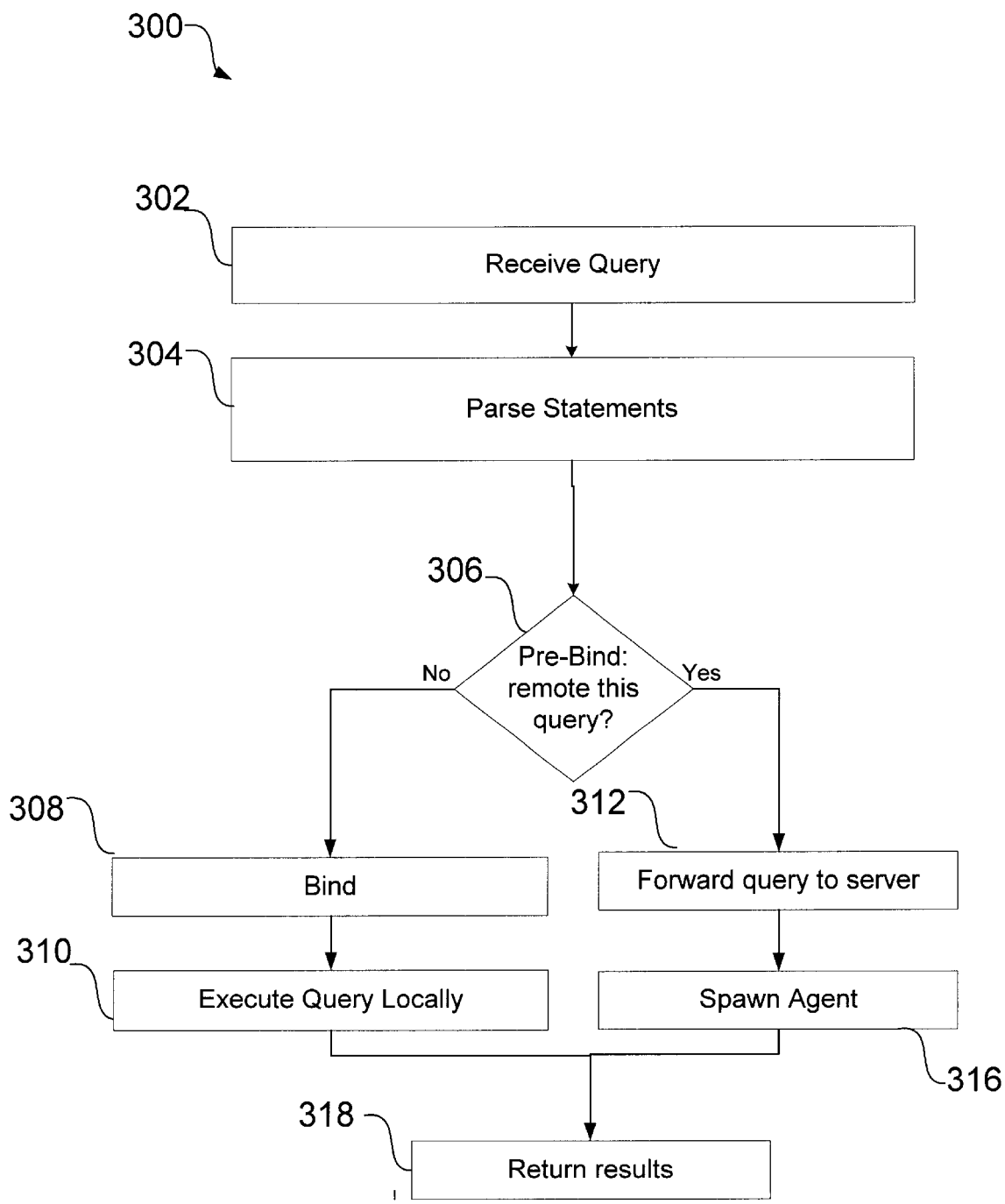
FIG. 3 is a flow chart illustrating one method of operation by which the multidimensional database system dynamically determines whether to process a query locally or remotely.
Figure 4:
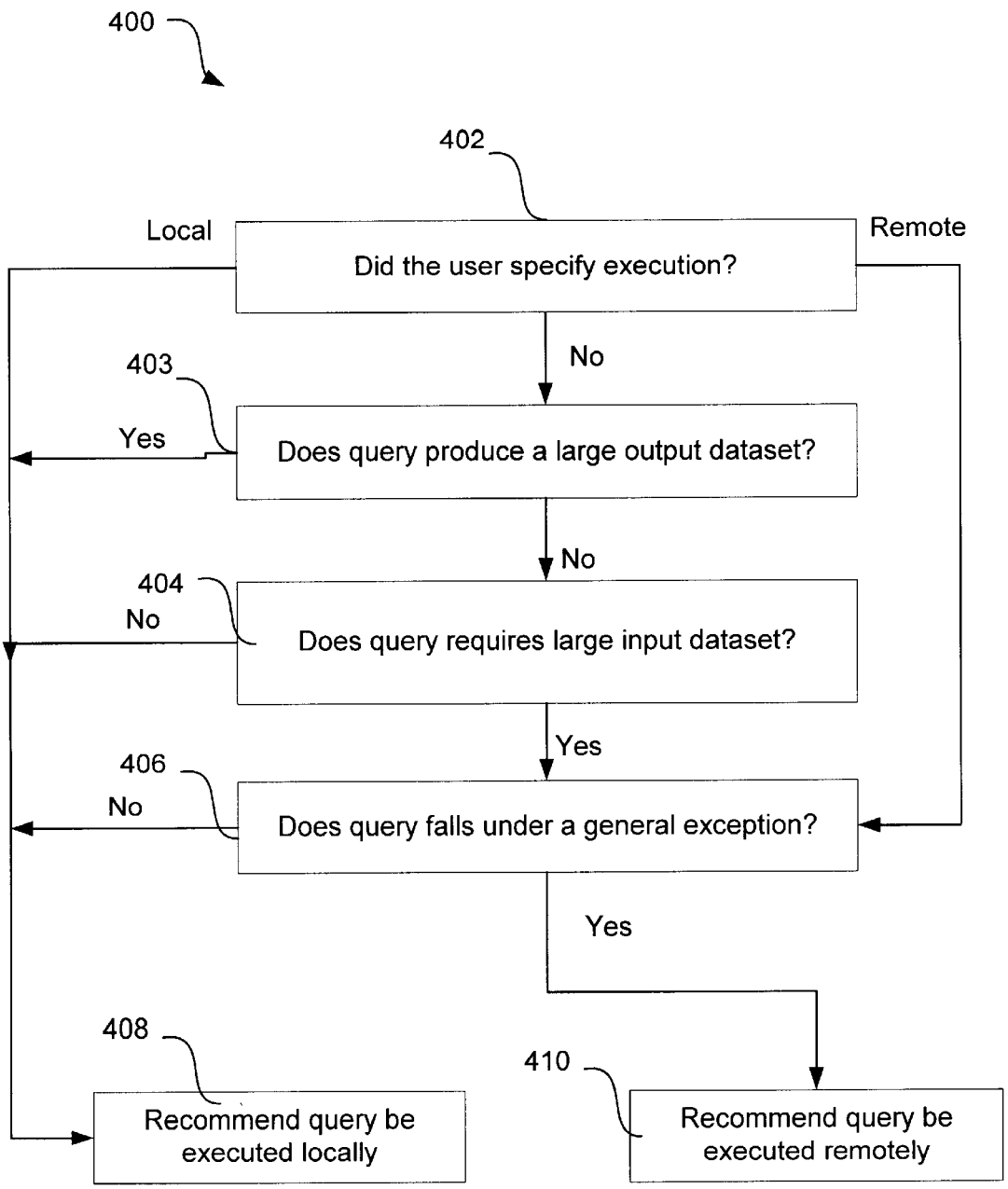
FIG. 4 is a flowchart illustrating in further detail one method of operation by which the multidimensional database system makes the determination.

FIG. 3 is a flow chart 300 illustrating one method of operation by which multidimensional database system 200 dynamically determines whether to process a query locally or remotely. More specifically, flow chart 300 illustrates one embodiment in which database system 200 determines, on a per query basis, whether to process the query locally with OLAP client 205 or remotely with OLAP server 260.

In block 302, OLAP client 205 receives a query from external application 207. In block 304, formula engine 211 parses the query according to a predefined syntax. This typically includes applying both lexical and syntactical checking. Lexical analysis concentrates on dividing the query into components, called tokens, based on punctuation and other keys. Syntactical checking determines whether the order and relationship of tokens meet the query language's syntax rules.

In block 306, referred to as the pre-bind phase, remoting module 221 dynamically determines whether the query should be executed locally vial OLAP client 205 or should be directed to OLAP server 260 for remote execution. FIG. 4 further illustrates the details of one mode of operation in which remoting module 221 of OLAP client 205 makes this determination.

If, based on the process described below in FIG. 4, remoting module 221 recommends that the query should be executed locally then OLAP client 205 proceeds from block 306 to block 308 and binds the query (optimizes) for local execution. Next, formula engine 211 executes the query (block 310) and returns results directly to external application 207 (block 318).

If, however, remoting module 221 recommends that the query should be executed remotely then OLAP client 205 proceeds from block 306 to block 312 and forwards the query to OLAP server 260. OLAP server 260 receives the query and spawns OLAP agent 209, such as an in-process thread (block 316). In one embodiment, OLAP agent 209 is an exact replica of OLAP client 205 and executes the query with an internal formula engine. In this way, OLAP agent 209 represents, and works on behalf of, OLAP client 205. In block 318, OLAP agent 209 returns the output data set to OLAP client 205 via OLAP server 260. OLAP client, in turn, forwards the results to external application 207.

FIG. 4 further illustrates the details of block 306 of FIG. 3 in which remoting module 221 of OLAP client 205 makes the determination of whether the query received form application 207 should be executed via OLAP client 205 or OLAP server 260. Remoting module 221 first determines whether a user has explicitly requested that the query be executed by OLAP server 260 or by OLAP client 205. If the user has specified OLAP client 205 then remoting module 221 jumps to block 408 and recommends that the query be executed via OLAP client 205. If the user has specified OLAP server 260 then remoting module 221 jumps to block 406.

If the user has not specified where the query should be executed, then remoting module 221 proceeds to block 403 and determines whether the query will produce a "large" output data set so as to make the query a good candidate for execution on the remote server 260. For example, queries that attempt to enumerate all members of a dimension within database 235 or that produce an output data set that exceed a predefined threshold are good candidates for execution locally because of the extensive network traffic that would otherwise be generated. In one embodiment, application 207 can specify the threshold such as 1000 data elements. If the estimated output data set is not deemed large then remoting module 221 proceeds to block 404.

In block 404, remoting module 221 determines whether the query requires a large input data set and thereby should be performed remotely. For example, consider a query that is interested in the top ten salespersons from a 5,000 person sales force. The resultant data set is small, which would imply that the query can be run locally, but the input data set is very large. To get the top ten salespersons OLAP system 200 must scan values for all 5,000 salespersons. If performed locally this will require moving a large amount of data from OLAP server 260 to OLAP client 205 even though the final output data set will only have ten records. Performing the query on server side will spare network traffic as well as memory consumption. Thus, remoting module 221 remotes most queries that apply filters, such as TopCount or TopPercent, that require large input data sets but produce small output data sets. If the input data set is small, remoting module 221 proceeds to block 408 and recommends that the query be run locally. If the input data set is expected to be large, as described above, then remoting module 221 proceeds to block 406.

Finally, in block 406 remoting module 221 determines whether the query falls under a general exception and, therefore, is predefined to execute on the local computing system. For example, queries that need a resource present only the local machine, such as a user defined function, are executed locally. Otherwise, remoting module 221 proceeds to block 410 and recommends that the query be executed remotely. In this manner, as illustrated in FIG. 4, remoting module 221 of OLAP client 205 dynamically determines whether a query should be executed locally by OLAP client 205 or remotely by OLAP server 260.

Various embodiments of a multi-dimensional database system have been described in which an OLAP client dynamically determines whether to a query should be executed locally or remotely. By considering the sizes of the data sets involved in the query and the data flow that they generate, the OLAP client seeks to balance a tradeoff between an increase in system scalability versus increases in network traffic and memory consumption. In one embodiment, the OLAP client may employ these above described process to determine which parts of a query should be executed locally and which parts of the query that should be executed remotely. For example, the OLAP client may determine that a row calculation should be executed on the client side and a column calculation should be executed on the server side. It is intended that only the claims and equivalents thereof limit this invention.

We claim:

1. A computerized method for processing a query directed to a multidimensional database comprising:
   receiving a query via a database client executing on a local computing system; and
   dynamically determining whether to execute the query on the local computing system or to direct the query to a database server executing on a remote computing system.

2. The method of claim 1, wherein the dynamic determination of where to execute the query is a function of the size of an output data set produced by the query.

3. The method of claim 1, wherein the dynamic determination of where to execute the query is a function of whether a user has explicitly requested that the query be executed by the local database client or the remote database server.

4. The method of claim 1, wherein the dynamic determination of where to execute the query is a function of whether an output data set produced by the query has been previously sent from the database server to the database client.

5. The method of claim 1, wherein the dynamic determination of where to execute the query is a function of whether the operation reduces the return data set to a smaller data set.

6. The method of claim 1, wherein the dynamic determination of where to execute the query is a function of whether the query falls under a set of queries that are predefined to execute on the local computing system.

7. The method of claim 6, wherein the set of predefined queries includes queries that need a resource present on the local machine.

8. The method of claim 7, wherein the resource is a user defined function.

9. The method of claim 1, and further including executing the query locally based on the dynamic determination.

10. The method of claim 9, wherein executing the query locally includes binding the query.

11. The method of claim 1, and further including forwarding the query to the database server for execution.

12. The method of claim 11, and further including spawning an agent on the database server to interface with the database server and execute the query.

13. The method of claim 1, wherein receiving the query includes parsing the query.

14. The method of claim 1, wherein the database server is an OLAP server.

15. The method of claim 1, wherein the database client is an OLAP client.

16. A computer-readable medium having computer-executable instructions for performing a method for processing a query directed to a multidimensional database, the method comprising:
   receiving a query via a database client executing on a local computing system; and
   dynamically determining whether to execute the query on the local computing system or to direct the query to a database server executing on a remote computing system.

17. The computer-readable medium of claim 16, wherein the dynamic determination of where to execute the query is a function of the size of an output data set produced by the query.

18. The computer-readable medium of claim 16, wherein the dynamic determination of where to execute the query is a function of whether a user has explicitly requested that the query be executed by the local database client or the remote database server.

19. The computer-readable medium of claim 16, wherein the dynamic determination of where to execute the query is a function of whether the an output data set produced by the query has been previously sent from the database server to the database client.

20. The computer-readable medium of claim 16, wherein the dynamic determination of where to execute the query is a function of whether the operation reduces the return data set to a smaller data set.

21. The computer-readable medium of claim 16, wherein the dynamic determination of where to execute the query is a function of whether the query falls under a set of queries that are predefined to execute on the local computing system.

22. The computer-readable medium of claim 21, wherein the set of predefined queries includes queries that need a resource present on the local machine.

23. The computer-readable medium of claim 22, wherein the resource is a user defined function.

24. The computer-readable medium of claim 16, and further including executing the query locally based on the dynamic determination.

25. The computer-readable medium of claim 24, wherein executing the query locally includes binding the query.

26. The computer-readable medium of claim 16, and further including forwarding the query to the database server for execution.

27. The computer-readable medium of claim 16, and further including spawning an agent on the database server to interface with the database server and execute the query.

28. The computer-readable medium of claim 16, wherein receiving the query includes parsing the query.

29. The computer-readable medium of claim 16, wherein the database server is an OLAP server.

30. The computer-readable medium of claim 16, wherein the database client is an OLAP client.

31. A computing system comprising:
a processor and a computer-readable medium;
an operating environment executing on the processor from the computer-readable medium; and
a database client executing within the operating environment for interfacing to a multidimensional database, wherein the database client receives a query from a software application executing within the operating environment and dynamically determines whether to execute the query within the computing system or to direct the query to a database server executing on a remote computing system.

32. The computerized system of claim 31, wherein the database client dynamically determines where to execute the query as a function of the size of an output data set produced by the query.

33. The computerized system of claim 31, wherein the database client dynamically determines where to execute the query as a function of whether a user has explicitly requested that the query be executed by the local database client or the remote database server.

34. The computerized system of claim 31, wherein the database client dynamically determines where to execute the query as a function of whether an output data set produced by the query has been previously sent from the database server to the database client.

35. The computerized system of claim 31, wherein the database client dynamically determines where to execute the query as a function of whether the operation reduces the return data set to a smaller data set.

36. The computerized system of claim 31, wherein the database client dynamically determines where to execute the query as a function of whether the query falls under a set of queries that are predefined to execute on the local computing system.

37. The computerized system of claim 36, wherein the set of predefined queries includes queries that need a resource present on the local machine.

38. The computerized system of claim 37, wherein the resource is a user defined function.

39. The computerized system of claim 31, wherein the database server spawns an agent on the database server to interface with the database server and execute the query when the database clients determines that the query should be executed remotely.

40. The computerized system of claim 31, wherein the database server is an OLAP server.

41. The computerized system of claim 31, wherein the database client is an OLAP client.

42. The computerized system of claim 31, wherein the database client determines that a set of calculations generated by the query should be executed by the database client and another set of calculations generated by the query should be executed by the database server.

43. The computerized system of claim 32, wherein the software application defines a threshold by which the database client determines whether the output data set is sufficiently large such that the query should be executed by an OLAP server.

* * * * *

UNITED STATES PATENT AND TRADEMARK OFFICE
CERTIFICATE OF CORRECTION

PATENT NO.    : 6,473,750 B1
DATED         : October 29, 2002
INVENTOR(S)   : Petculescu et al.

It is certified that error appears in the above-identified patent and that said Letters Patent is hereby corrected as shown below:

<u>Title page,</u>
Item [57], ABSTRACT,
Line 3, please delete "determines" and insert therefor -- determine --;

<u>Column 9,</u>
Line 8, please delete the word "an".

Signed and Sealed this

Twenty-second Day of April, 2003

JAMES E. ROGAN
*Director of the United States Patent and Trademark Office*